United States Patent
Pearson et al.

(10) Patent No.: US 7,720,335 B2
(45) Date of Patent: May 18, 2010

(54) HYBRID PLANAR LIGHTWAVE CIRCUIT WITH REFLECTIVE GRATINGS

(75) Inventors: Matt Pearson, Ashton (CA); Ashok Balakrishnan, Ottawa (CA); Serge Bidnyk, Ottawa (CA)

(73) Assignee: Enablence Inc., Kanata, Ontario (CA)

( * ) Notice: Subject to any disclaimer, the term of this patent is extended or adjusted under 35 U.S.C. 154(b) by 250 days.

(21) Appl. No.: 11/865,290

(22) Filed: Oct. 1, 2007

(65) Prior Publication Data

US 2008/0240654 A1    Oct. 2, 2008

Related U.S. Application Data

(63) Continuation-in-part of application No. 11/143,800, filed on Jun. 3, 2005, now Pat. No. 7,304,797, which is a continuation-in-part of application No. 10/971,129, filed on Oct. 25, 2004, now Pat. No. 7,151,635.

(60) Provisional application No. 60/828,080, filed on Oct. 4, 2006, provisional application No. 60/576,594, filed on Jun. 4, 2004, provisional application No. 60/555,697, filed on Mar. 24, 2004.

(51) Int. Cl.
G02B 6/34 (2006.01)
(52) U.S. Cl. .......................... 385/37; 385/14; 385/129; 385/130; 385/131; 385/141
(58) Field of Classification Search .................. 385/14, 385/49, 37, 129, 130, 131, 132, 141
See application file for complete search history.

(56) References Cited

U.S. PATENT DOCUMENTS

| | | | | |
|---|---|---|---|---|
| 4,935,930 | A * | 6/1990 | Handa | 372/7 |
| 5,799,118 | A | 8/1998 | Ogusu et al. | 385/14 |
| 6,134,359 | A | 10/2000 | Keyworth et al. | 385/33 |
| 6,542,685 | B1 * | 4/2003 | Yoneda | 385/130 |
| 6,937,797 | B2 * | 8/2005 | Mizuno et al. | 385/43 |
| 6,959,129 | B2 | 10/2005 | He et al. | 385/24 |
| 7,068,885 | B2 | 6/2006 | Bidnyk et al. | 385/37 |
| 7,149,387 | B2 | 12/2006 | Balakrishnan et al. | 385/37 |
| 7,151,635 | B2 | 12/2006 | Bidnyk et al. | 359/572 |
| 7,209,612 | B2 | 4/2007 | Balakrishnan et al. | 385/37 |
| 7,304,797 | B2 | 12/2007 | Balakrishnan et al. | 359/572 |
| 7,561,765 | B2 * | 7/2009 | Funabashi et al. | 385/14 |
| 2003/0118288 | A1 * | 6/2003 | Korenaga et al. | 385/49 |

(Continued)

FOREIGN PATENT DOCUMENTS

EP    0649041    4/1995

(Continued)

OTHER PUBLICATIONS

"Silica-Based Planar Lightwave Circuits" Himeno et al., IEEE Journal of Selected Topics in Quantum Electronics vol. 4, Issue No. 6, pp. 913-924 Nov./Dec. 1998.

*Primary Examiner*—Brian M Healy
(74) *Attorney, Agent, or Firm*—Teitelbaum & MacLean; Neil Teitelbaum; Doug MacLean

(57) ABSTRACT

The present invention relates to a hybrid planar lightwave circuit in which a silicon reflective diffraction grating etched with a highly accurate deep reactive ion etching process is mounted in a trench formed in a high optical performance silica on silicon waveguide device.

14 Claims, 8 Drawing Sheets

U.S. PATENT DOCUMENTS

2006/0093002 A1   5/2006   Park et al. ................ 372/46.01
2008/0240654 A1*  10/2008  Pearson et al. ................ 385/37

FOREIGN PATENT DOCUMENTS

| | | |
|---|---|---|
| EP | 0905533 | 3/1999 |
| WO | 99/50700 | 10/1999 |
| WO | 2005/009131 | 9/2005 |

* cited by examiner

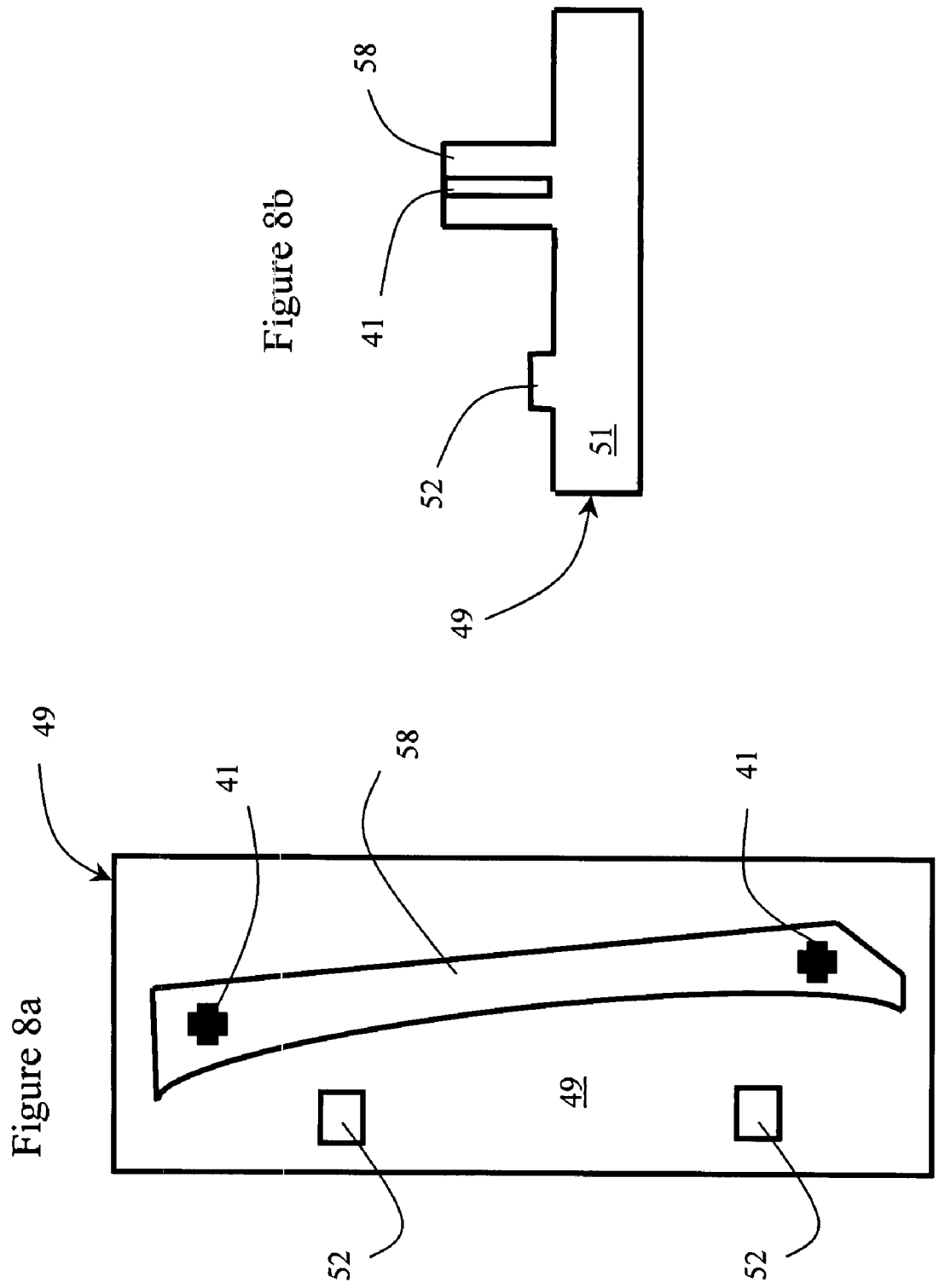

HYBRID PLANAR LIGHTWAVE CIRCUIT WITH REFLECTIVE GRATINGS

CROSS-REFERENCE TO RELATED APPLICATIONS

The present invention claims priority from U.S. Patent Application No. 60/828,080 filed Oct. 4, 2006, which is incorporated herein by reference. The present application is a continuation in part of U.S. patent application Ser. No. 11/143,800 now U.S. Pat. No. 7,304,797, filed Jun. 3, 2005, which claimed priority from U.S. Patent Application 60/576,594 filed Jun. 4, 2004, and which is a continuation in part of U.S. patent application Ser. No. 10/971,129 filed Oct. 25, 2004 and issued as U.S. Pat. No. 7,151,635 on Dec. 19, 2006, which claimed priority from U.S. Patent Application 60/555,697 filed Mar. 24, 2004, which are all incorporated herein by reference for all purposes.

TECHNICAL FIELD

The present invention relates to planar lightwave circuits (PLC), and in particular to PLCs with reflective diffraction gratings hybridized onto a multi-layer waveguide structure.

BACKGROUND OF THE INVENTION

In optics, a diffraction grating is an array of fine, parallel, equally spaced grooves ("rulings") on a reflecting or transparent substrate, which grooves result in diffractive and mutual interference effects that concentrate reflected or transmitted electromagnetic energy in discrete directions, called "orders," or "spectral orders."

The groove dimensions and spacings are on the order of the wavelength in question. In the optical regime, in which the use of diffraction gratings is most common, there are many hundreds, or thousands, of grooves per millimeter.

Order zero corresponds to direct transmission or specular reflection. Higher orders result in deviation of the incident beam from the direction predicted by geometric (ray) optics. With a normal angle of incidence, the angle θ, the deviation of the diffracted ray from the direction predicted by geometric optics, is given by the following equation, where m is the spectral order, λ is the wavelength, and d is the spacing between corresponding parts of adjacent grooves:

$$\theta = \pm \sin^{-1}\left(\frac{m\lambda}{d}\right)$$

Because the angle of deviation of the diffracted beam is wavelength-dependent, a diffraction grating is dispersive, i.e. the diffraction grating separates the incident beam spatially into its constituent wavelength components, producing a spectrum.

The spectral orders produced by diffraction gratings may overlap, depending on the spectral content of the incident beam and the number of grooves per unit distance on the grating. The higher the spectral order, the greater the overlap into the next-lower order. Diffraction gratings are often used in monochromators and other optical instruments. By controlling the cross-sectional shape of the grooves, it is possible to concentrate most of the diffracted energy in the order of interest. This technique is called "blazing."

Originally high resolution diffraction gratings were ruled. The construction of high quality ruling engines was a large undertaking. A later photolithographic technique allows gratings to be created from a holographic interference pattern. Holographic gratings have sinusoidal grooves and so are not as bright, but are preferred in monochromators because they lead to a much lower stray light level than blazed gratings. A copying technique allows high quality replicas to be made from master gratings, this helps to lower costs of gratings.

A planar waveguide reflective diffraction grating includes an array of facets arranged in a regular sequence. The performance of a simple diffraction grating is illustrated with reference to FIG. 1. An optical beam 1, with a plurality of wavelength channels $\lambda_1, \lambda_2, \lambda_3 \ldots$, enters a diffraction grating 2, with grading pitch $\Lambda$ and diffraction order m, at a particular angle of incidence $\theta_{in}$. The optical beam is then angularly dispersed at an angle $\theta_{out}$ depending upon wavelength and the order, in accordance with the grating equation:

$$m\lambda = \Lambda(\sin \theta_{in} + \sin \theta_{out}) \quad (1)$$

From the grating equation (1), the condition for the formation of a diffracted order depends on the wavelength $\lambda_N$ of the incident light. When considering the formation of a spectrum, it is necessary to know how the angle of diffraction $\theta_{Nout}$ varies with the incident wavelength $\theta_{in}$. Accordingly, by differentiating the equation (1) with respect to $\theta_{Nout}$, assuming that the angle of incidence $\theta_{in}$ is fixed, the following equation is derived:

$$\partial \theta_{Nout}/\partial \lambda = m/\Lambda \cos \theta_{Nout} \quad (2)$$

The quantity $d\theta_{Nout}/d\lambda$ is the change of the diffraction angle $\theta_{Nout}$ corresponding to a small change of wavelength $\lambda$, which is known as the angular dispersion of the diffraction grating. The angular dispersion increases as the order m increases, as the grading pitch $\Lambda$ decreases, and as the diffraction angle $\theta_{Nout}$ increases. The linear dispersion of a diffraction grating is the product of this term and the effective focal length of the system.

Since light of different wavelengths $\lambda_N$ are diffracted at different angles $\theta_{Nout}$, each order m is drawn out into a spectrum. The number of orders that can be produced by a given diffraction grating is limited by the grating pitch $\Lambda$, because $\theta_{Nout}$ cannot exceed 90°. The highest order is given by $\Lambda/\lambda_N$. Consequently, a coarse grating (with large $\Lambda$) produces many orders while a fine grating may produce only one or two.

A blazed grating is one in which the grooves of the diffraction grating are controlled to form right triangles with a blaze angle w, as shown in FIG. 1. The selection of the blaze angle w offers an opportunity to optimize the overall efficiency profile of the diffraction grating, particularly for a given wavelength.

Planar waveguide diffraction based devices provide excellent performance in the near-IR (1550 nm) region for Dense Wavelength Division Multiplexing (DWDM). In particular, advancements in Echelle gratings, which usually operate at high diffraction orders (40 to 80), high angles of incidence (approx 60°) and large grading pitches, have lead to large phase differences between interfering paths. Because the size of grating facets scales with the diffraction order, it has long been considered that such large phase differences are a necessity for the reliable manufacturing of diffraction-based planar waveguide devices. Thus, existing devices are limited to operation over small wavelength ranges due to the high diffraction orders required.

Reflective diffraction gratings, etched directly into a planar lightwave circuit, are often used as wavelength filters due to their high performance and small size. Conventional PLCs can be fabricated on a number of different types of substrates, including silica-on-silicon, silicon-on-insulator (SOI), or indium phosphide (InP). A typical configuration of a diffraction grating filter formed at a side of a slab waveguide is shown in FIG. 1. It is assumed that all the action is in a two-dimensional plain parallel to the plane of the page, i.e. the light is confined in the vertical direction (perpendicular to the page).

Another system is, illustrated in FIGS. 2 and 3, in which a concave reflective diffraction grating 10 is formed at an edge of a slab waveguide 11 provided in chip 12. An input port is defined by an end of a waveguide 13, which extends from an edge of the chip 12 to the slab waveguide 11 for transmitting an input wavelength division multiplexed (WDM) signal, comprising a plurality of wavelength channels ($\lambda_1$, $\lambda_2$, $\lambda_3$ ... ), thereto. The light enters through the input port into the two-dimensional slab waveguide 11, and expands horizontally, i.e. diverges in the horizontal plane. Subsequently, the light encounters the reflective grating 10, which is composed of a number of small reflective facets. The first-order reflected signals combine constructively at one location, based on the wavelength of light, where an end of an output waveguide 15 is positioned to capture the wavelength channel of interest.

The diffraction grating 10, as defined in U.S. Pat. No. 7,151,635 issued Dec. 19, 2006 to Enablence Technologies Inc, which is incorporated herein by reference, and as illustrated in FIG. 2, has an aspect ratio (F/S) greater than 3, preferably greater than 5 and potentially greater than 10, and a sidewall length S less than or equal to the average wavelength of the wavelength channels ($\lambda_1$, $\lambda_2$, $\lambda_3$ ... ). The input waveguide 13 is positioned to ensure that the incident angle $\theta_{in}$ is less than 45°, preferably less than 30° and potentially less than 15° or even less than 6°, and the grating pitch $\Lambda$ is selected to ensure that the grating 10 provides diffraction in an order of 5 or less and preferably 3 or less. The diffraction grating 10 disperses the input signal into constituent wavelengths and focuses each wavelength channel on a separate output port in the form of the ends of the output waveguide 15, which are disposed along a focal line 16 of the grating 10 defined by a Rowland circle, for transmission back to the edge of the chip 12. The illustrated device could also be used to multiplex several wavelength channels, input the waveguides 15, into a single output signal transmitted out to the edge of the chip 12 via the input waveguide 13. The input and output ports represent positions on the slab waveguide 11 at which light can be launched or captured; however, the ports can be optically coupled with other transmitting devices or simply blocked off.

One of the greatest challenges in fabricating a reflective diffraction grating, such as that shown in FIGS. 1 and 2, in a PLC, is the very high quality etching required to produce the small reflective facets. There are two main challenges which must be overcome to fabricate an efficient grating, i.e. a near perfect verticality of etch, and a very smooth sidewall. The grating teeth shown in FIG. 2 would typically be metallized to improve their reflectivity. However, since the light travels in the underlying silica, it is reflected off the inner metal, which conforms around all the roughness and non-verticality of the silica etch, resulting in performance problems for the grating. The only way to eliminate this problem is to develop a very high-quality vertical etch, with very low roughness.

Unfortunately, in most etch processes there is typically a tradeoff in terms of etch verticality versus roughness of the etched wall, contrary to what is necessary for making a good grating. This is true in most material systems; however, recent developments in Deep Reactive Ion Etching (DRIE) of Silicon have allowed for extremely deep, vertical, smooth etches, when implemented in silicon only. The DRIE process has become very common for use in MEMs components and many other applications.

However, using silicon as a PLC waveguide is very restrictive, and typically results in a low-performance component. To achieve the high-performance, low-loss components required in modern telecommunication systems, most PLC filter chips are fabricated in silica-on-silicon substrates, where the light travels only in a thin glass layer on top of the silicon. DRIE technology can be applied to silica wafers, but the etch results are not nearly as good as those found in silicon. For that reason, virtually all reflective diffraction gratings etched in silica suffer from performance problems associated with the verticality and/or roughness of the etched mirrors.

An object of the present invention is to overcome the shortcomings of the prior art by providing a hybrid PLC device in which a highly precise diffraction grating is manufactured separately from a high quality waveguide structure.

SUMMARY OF THE INVENTION

Accordingly, the present invention relates to a planar lightwave circuit (PLC) device comprising:

an input port for launching an input beam of light;

a slab waveguide on a first substrate, defining a core layer between upper and lower cladding, having a trench formed therein down to the core layer;

a reflective diffraction grating on a second substrate mounted in the trench for diffracting the input beam of light; and a first output port for outputting at least a portion of the input beam of light;

wherein the core layer and the reflective diffraction grating are formed separately of different materials;

whereby the reflective optical device is etched with higher precision than possible in the slab waveguide.

Another embodiment of the present invention relates to a method of forming a planar lightwave circuit comprising the steps of:

a) forming a slab waveguide on a first substrate including a core layer between upper and lower cladding;

b) forming a trench in the slab waveguide down to the core layer;

c) forming a diffraction grating on a second substrate; and d) mounting the diffraction grating in the trench.

BRIEF DESCRIPTION OF THE DRAWINGS

The invention will be described in greater detail with reference to the accompanying drawings which represent preferred embodiments thereof, wherein:

FIG. 5b is a side view of the reflective diffraction grating of FIG. 5a;

FIG. 8a is a top view of an alternate embodiment of a reflective diffraction grating of the device of FIG. 4 with spacer projections; and FIG. 8b is a side view of the reflective diffraction grating of FIG. 8a;

DETAILED DESCRIPTION

Figure 1:
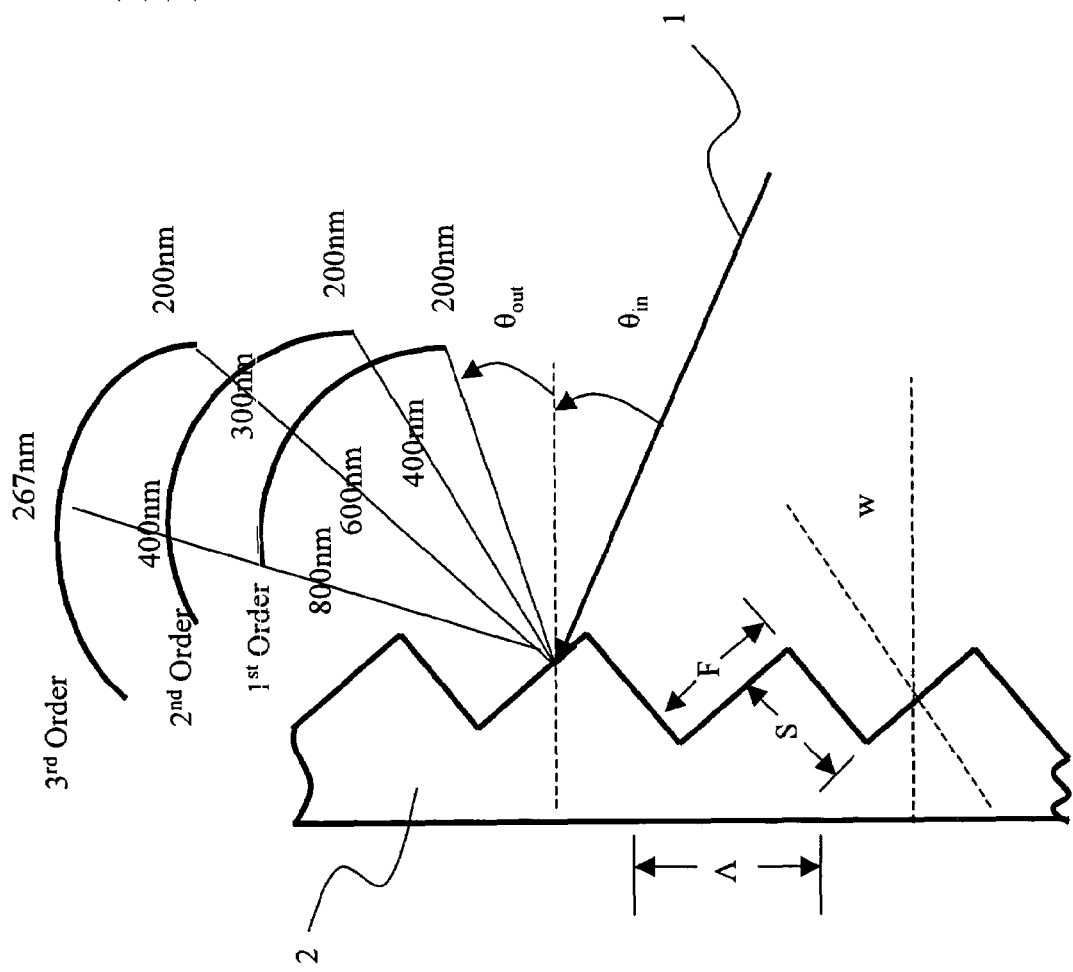
FIG. 1 illustrates a conventional reflective diffraction grating.
Figure 2:
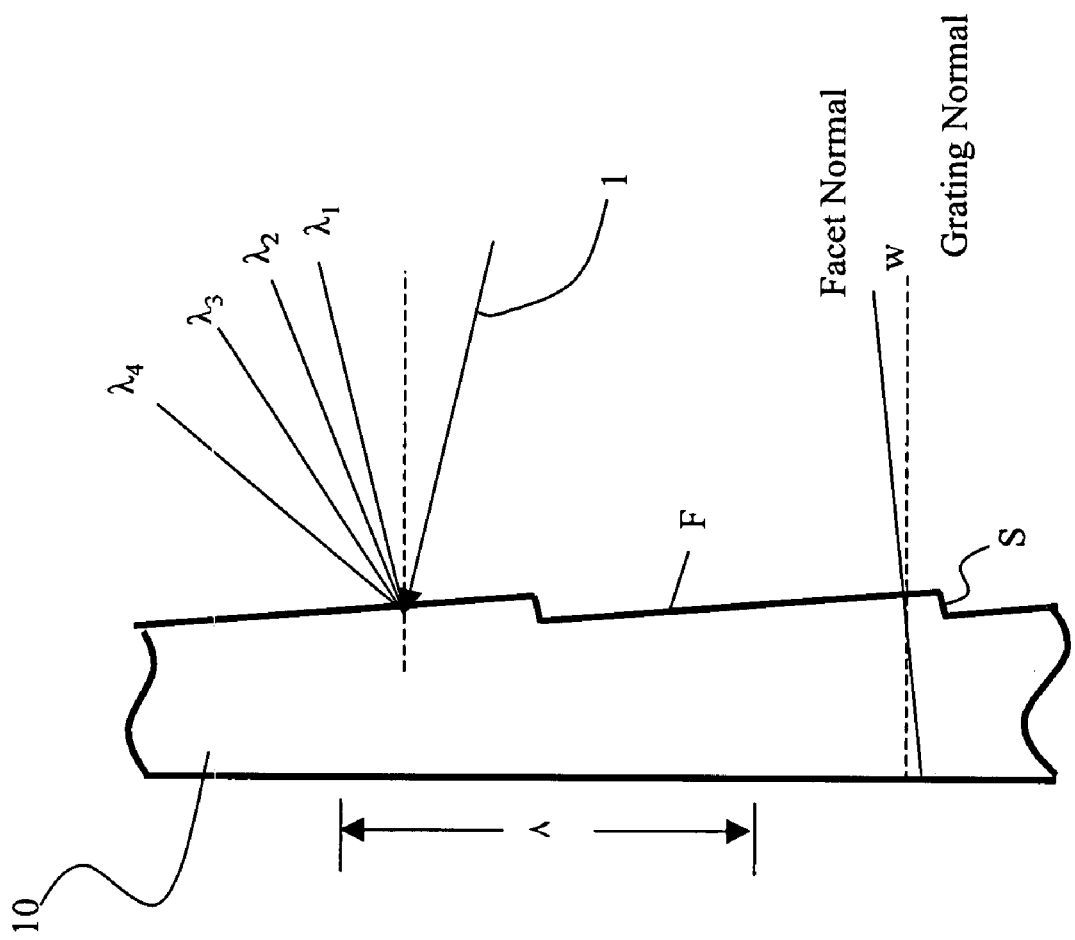
FIG. 2 illustrates a conventional concave reflective diffraction grating.
Figure 3:
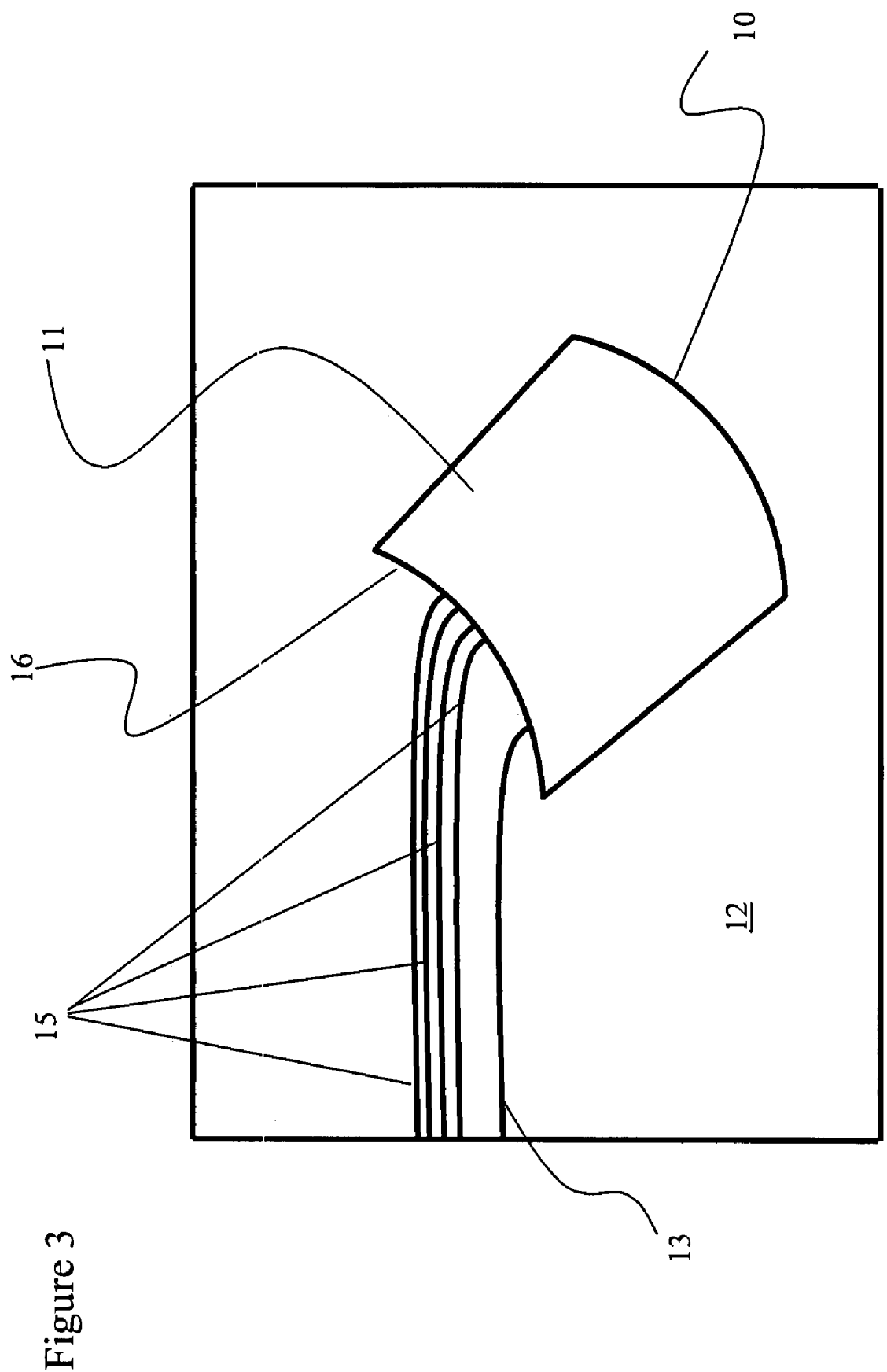
FIG. 3 illustrates a conventional PLC device with the concave reflective diffraction grating of FIG. 2.
Figure 4:
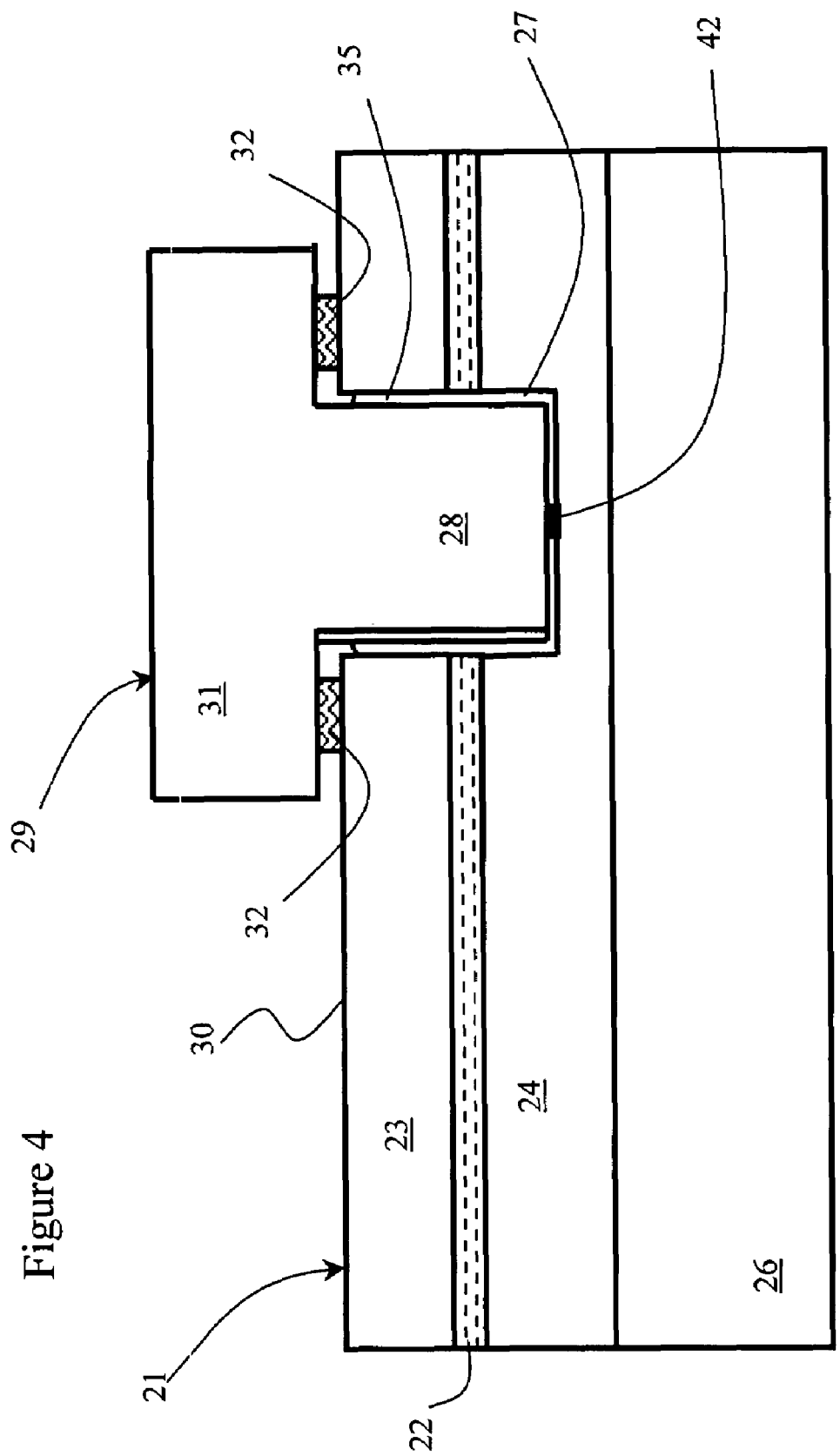
FIG. 4 is a cross-sectional view of a hybrid PLC device in accordance with the present invention.

With reference to FIG. 4, a PLC chip 21, e.g. silica-on-silicon, in accordance with the present invention, is fabricated to look and function very similar to the layout shown in FIG. 3 with a silica (or some other high quality waveguiding material) core layer 22 between upper and lower cladding layers 23 and 24 formed on silicon substrate 26. However, since the etching of high-quality grating teeth directly in the silica material system is very difficult, a simple deep trench 27 is etched down through the core layer 22 and into the lower cladding layer 23 or deeper for receiving a separate reflective diffraction grating 28, which is mounted within the trench 27. The trench 27 has an outline slightly larger than the intended grating 28, but generally follows the shape thereof, but has no grating teeth, just a continuous wall. The verticality and the smoothness of the etched walls of the trench 27 are not critical.

On a separate wafer grating chip 29, using a pure substrate 31 of a material different than the core layer 22, e.g. silicon, a silicon based material or an indium-phosphide (InP) material, the intended grating 28 is etched using an advanced etching system with much higher precision, e.g. DRIE system, which results in very vertical, smooth sidewalls for the teeth of the grating 28. A thin layer of a reflective material, such as gold, is deposited on the grating 28 to create highly-reflective teeth sidewalls. Since the triangular teeth of the grating 28 are relatively small, typically several thousand such gratings will fit on a standard 6" silicon wafer. Preferably, the grating 28 is similar or identical to the above-identified diffraction grating 10 for separating an input optical beam into a plurality, e.g. up to 8, 16, 40 or more, of constituent wavelength channels.

The gratings 28 are diced out, flipped, and inserted in the etched trench 27 on the silica PLC chip 21. The entire process is typically done using an automated flip-chip bonder, which aligns the grating chip 29 to the PLC substrate 26, drops the grating 28 into position in the trench 27, and completes a solder bonding process, which involves placing solder 32 between corresponding solder pads on the substrate 31 and the PLC chip 21 or by simply heating up an exists solder bump pre-positioned therebetween, to lock the grating chip 29 in place on the PLC chip 21.

Light traveling towards the grating 28 would normally experience a high loss due to scattering at the rough trench 27 etched in the silica PLC chip 21; however, to eliminate the loss, an index-matching epoxy 35 is dispensed near one end of the grating trench 27. The grating chip 29 and the trench 27 are designed, e.g. with a constant gap therebetween, so that the epoxy 35 will wick across the thin spacing between the grating 28 and the etched silica wall of the trench 27, completely filling all cracks, effectively submerging the grating 28 in the silica trench 27. The index-matching epoxy 35 is then cured, for example through a 100° C. bake, during which the epoxy 35 cures to a refractive index nearly identical to that of the waveguide material, e.g. silica, used in the core 22 of the PLC chip 21, thereby eliminating any optical interface in the waveguide material, including all the roughness and non-verticality of the trench 27, creating a continuous refractive index through the silica chip 21 directly to the reflective grating 28.

Accordingly, a hybrid PLC device using very low-loss silica or other high quality waveguiding material is created, while also taking advantage of the DRIE capabilities available using silicon or other high precision etching material to construct a highly precise or smooth optical grating 28. The result is the best of both material systems, hybridly integrated to form one component.

The proposed configuration can also be implemented for a different number of material systems and grating configurations. As well as for reflective gratings and concave reflective grating, the same technique can be used for creating efficient mirrors, in particular a very smooth concave, curved or parabolic mirror, by replacing the grating chip 29 with another chip having one or more reflective or at least partially reflective surfaces for efficiently routing light around tight corners in a PLC chip.

One of the most effective applications of such a filter is for fabricating a diplexer or triplexer for the access telecommunication market, in particular those disclosed in U.S. Pat. No. 7,068,885 issued Jun. 27, 2006 to Bidnyk et al, U.S. Pat. No. 7,149,387 issued Dec. 12, 2006 to Balakrishnan et al, and U.S. Pat. No. 7,209,612 issued Apr. 24, 2007 to Pearson et al, which are all incorporated herein by reference, including a stepped diffraction grating having triangular teeth with alternating reflective faces and non-reflecting sidewalls, such as the one disclosed in U.S. Pat. No. 7,151,635 issued Dec. 19, 2006 to Enablence Technologies Inc, which is incorporated herein by reference. The diffraction grating disclosed in the Enablence patent requires a sidewall length S, which is less than or equal to two times the average wavelength of the input light, e.g. 1550 nm, and preferably less than or equal to the average wavelength of the input light, for the which the grating 28 is designed to multiplex/demultiplex. Furthermore, an aspect ratio of the diffraction grating, defined by the facet length divided by the sidewall length, is greater than 3, preferably greater than 5, and more preferably greater than 10. The aforementioned specifications require highly accurate manufacturing processes, which are difficult to achieve in silica on silicon structures, but achievable in deep reactive ion etching of silicon.

Preferably, the grating chip 29 includes a single-crystal silicon, silicon-based or InP substrate, etched using a Deep Reactive Ion Etching (DRIE) process. The DRIE process is relatively standard and readily available from wafer foundries throughout the world, and typically uses an etch process which alternates between a silicon etching plasma ($SF_6$) and a passivating plasma ($C_4F_8$), which results in very high aspect ratio wells, with smooth, vertical etching of the grating 28.

Figure 5B:
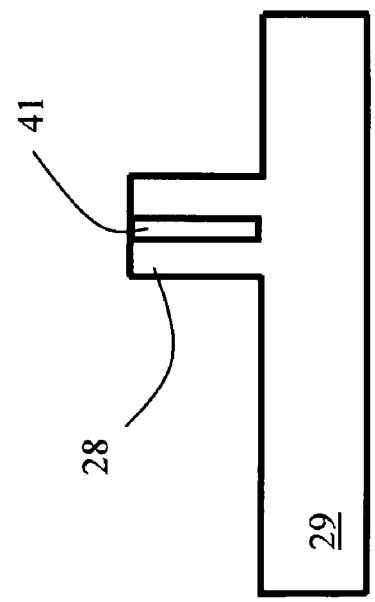
Figure 5A:
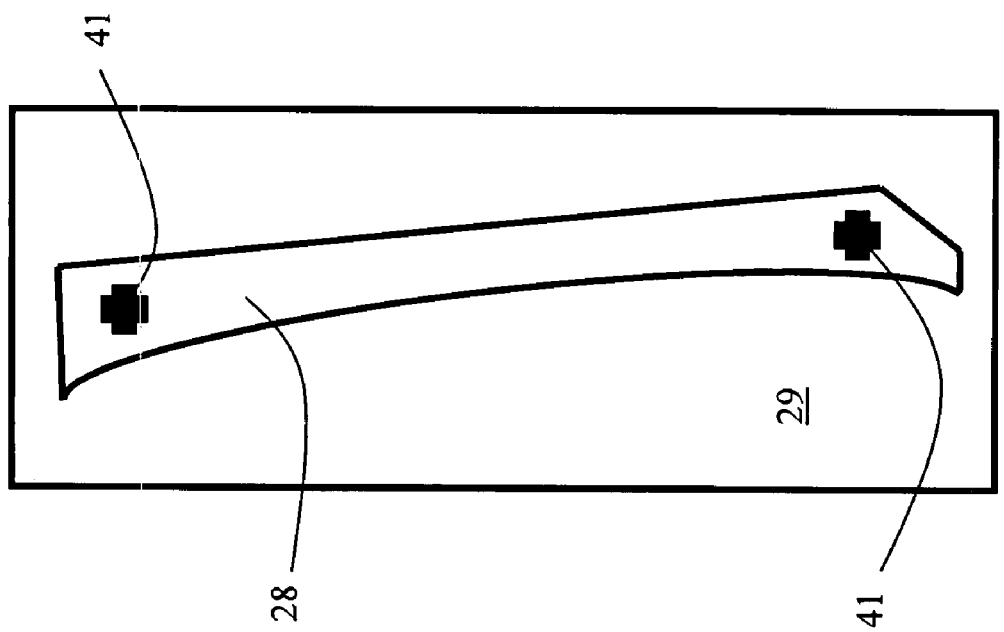
FIG. 5a is a top view of a alternate embodiment of a reflective diffraction grating of the device of FIG. 4 with alignment markers.
Figure 6:
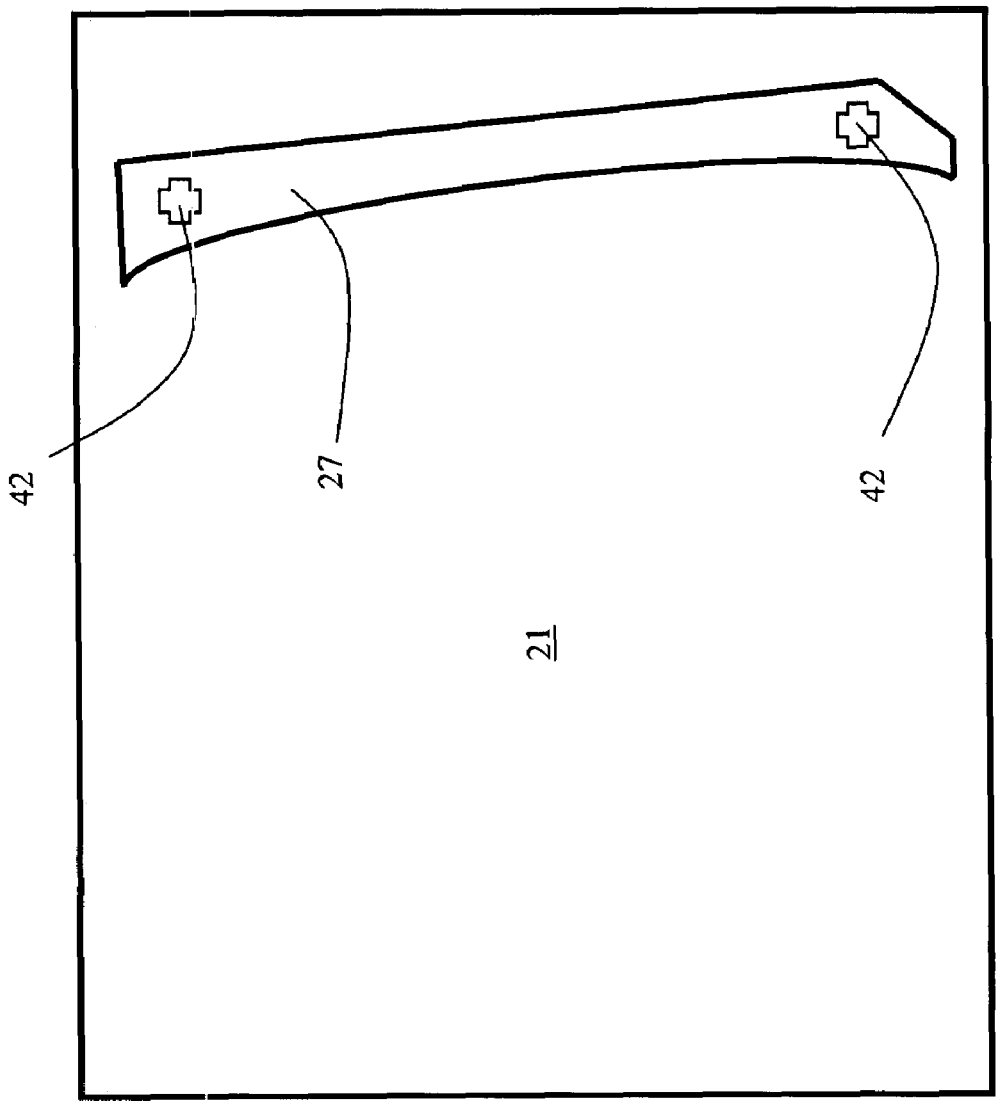
FIG. 6 is a top view of a PLC waveguide chip of the device of FIG. 4.

The grating wafer, since it comprises only the gratings 28 themselves, can contain a very high number of grating chips 29, often several thousand on a standard 6" wafer. The single-layer etch process can be used for defining the grating 28 and alignment marks 41, as shown in FIGS. 5a and 5b. The alignment marks 41 are recesses or holes etched in the structure of the grating 28 using the same mask, which defines the teeth of the grating 28, to ensure that there is no mask alignment error between the alignment marks 41 and the grating teeth. The alignment marks 41 have a specific shape, e.g. cross, triangular, corresponding with markers 42, as in FIG. 5c, on the PLC chip 21, specifically in the trench 27.

For gratings 28 that are hybridly attached to a PLC chip 21, as shown in FIG. 4, the verticality of the walls of the reflective grating 28 is established by the flat horizontal upper surface 30 of the PLC chip 21, where the grating chip 29, i.e. a lower surface of the substrate 31, is attached. In many PLC fabrication processes an upper surface 30, which is flat all over, is not always attainable; however, in many cases the topology of the top surface 30 of the PLC chip 21 is usually quite reproducible from chip to chip and wafer to wafer with certain flat sections 45 separate from abnormal rough sections 46. Accordingly, an alternate embodiment of the present invention, illustrated in FIG. 7 includes a grating chip 49 with one or more bump or spacer projection(s) 52 extending from a substrate 51 parallel to a reflective diffraction grating 58, which is similar to the diffraction gratings 28 hereinbefore described. The spacer projection 52 can be formed in the same manufacturing step and/or process as the grating 58.

Figure 7:
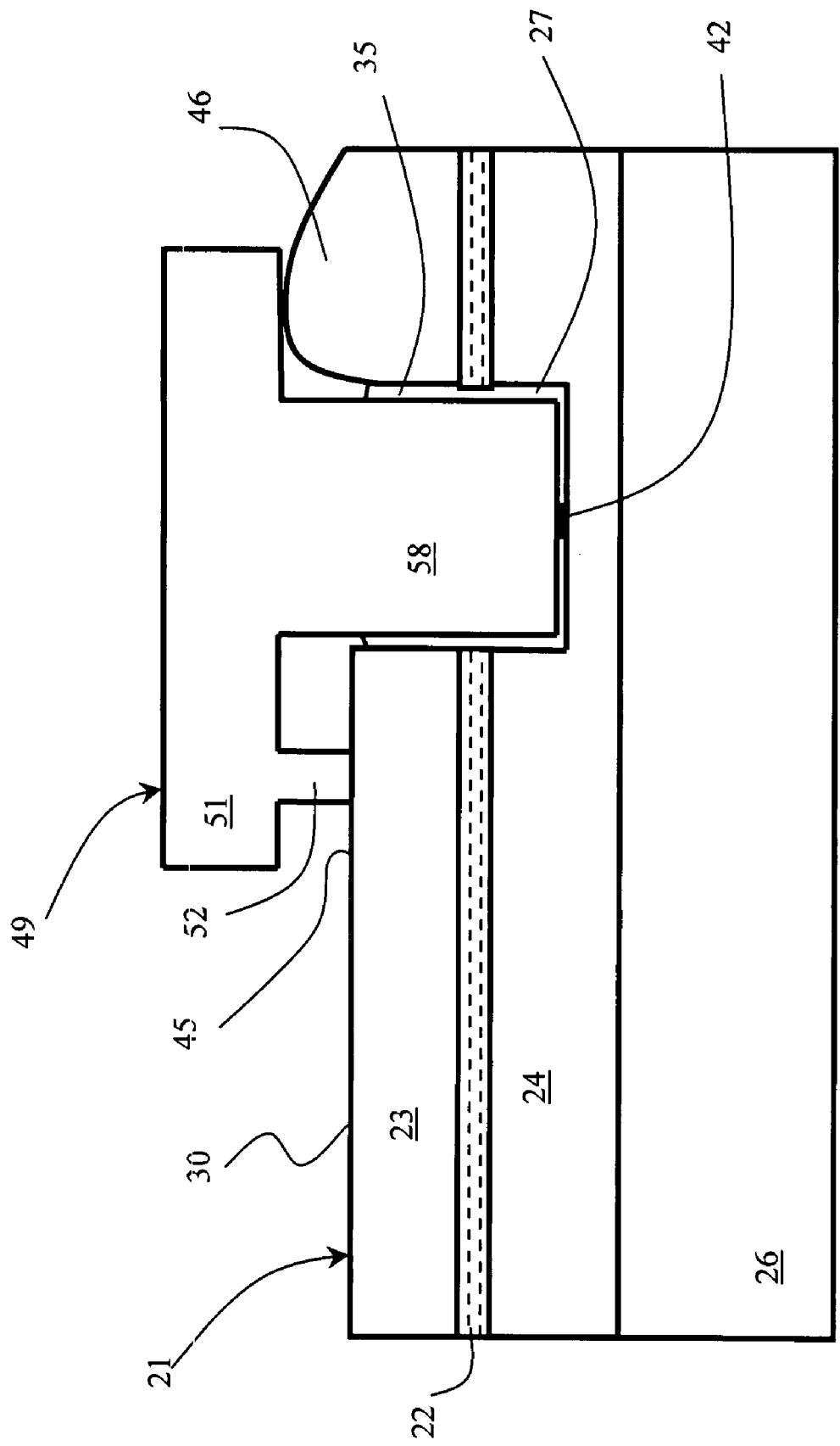
FIG. 7 is a cross-sectional view of an alternative embodiment of a hybrid PLC device in accordance with the present invention.

A similar technique to that shown in FIG. 7 can be used to intentionally angle the grating 58 for a controlled vertical angle. For example, on a PLC chip 21 with flat sections 45, an intentional non-verticality of the grating 58 can be imposed by incorporating an angled surface to the bump 52 on the grating chip 49, whereby the substrate 51 is mounted at an acute angle to the substrate 26 and the core layer 22. The acute angle could be 45° or less to enable light to be redirected from traveling in a horizontal direction to a vertical direction; however, angles of less than ±20° or less than ±10° are more practical. Typically, to compensate for an inaccurate etching processes, an angle of less than ±6° is sufficient. Accordingly, with the higher angles some or all of the light can be reflected into the lower or upper claddings 23 or 24, providing a fixed attenuation of the reflected signal, or for other such applications.

An example application of the present invention is for hybrid filter chips used to separate wavelengths of light in a telecommunications system. A triplexer, such as the ones disclosed in U.S. Pat. No. 7,068,885, used in fiber-to-the-home (FTTH) systems would be one such component, wherein the hybrid grating 2 is used to separate different upstream and/or downstream wavelengths.

This invention relaxes many of the very challenging etch requirements associated with planar lightwave circuit (PLC) reflective grating technologies, which have been a major issue for wafer foundries in the past. It transfers these etch requirements to a hybrid grating, which can take advantage of new DRIE technologies in silicon. This results in lower wafer fabrication costs, and a waveguide process which is much more simple and easily portable to other foundries.

The present invention overcomes the shortcomings of the prior art, by hybridly integrating a low-loss silica waveguide PLC 1, with a high-quality DRIE-etched, silicon grating 2. The hybrid integration is made possible by modern flip-chip bonding techniques that are typically used for attaching lasers and detectors onto PLC substrates. In addition, the present invention provides a means for intentionally altering the verticality of the grating during bonding.

We claim:

1. A planar lightwave circuit (PLC) device comprising:
an input port for launching an input beam of light;
a slab waveguide on a first substrate, defining a core layer between upper and lower cladding, having a trench formed therein down to the core layer;
a reflective diffraction grating provided on a second substrate mounted in the trench optically coupled with the input port for diffracting the input beam of light; and
a first output port optically coupled with the reflective diffraction grating for outputting at least a portion of the input beam of light redirected by the reflective diffraction grating;
whereby the core layer and the reflective diffraction grating are fabricated separately of different materials.

2. The PLC device according to claim 1, wherein the reflective optical device is a reflective diffraction grating comprised a plurality of teeth etched in a material selected from the group consisting of silicon, a silicon-based material, and indium phosphide.

3. The PLC device according to claim 1, wherein the slab waveguide comprises a silica on silicon structure in which the core layer is silica.

4. The PLC device accord to claim 3, further comprising an adhesive in the trench between the core layer and the reflective optical device; wherein the adhesive has a refractive index matched to that of the core layer.

5. The PLC device according to claim 1, further comprising a projection extending from the second substrate having a contact surface in contact with a flat section of the slab waveguide, for spacing the second substrate from the slab waveguide to avoid surface abnormalities on the slab waveguide.

6. The PLC device according to claim 5, wherein the contact surface is at an acute angle to the second substrate, whereby the second substrate is mounted at an acute angle to the first substrate for directing the input beam at an acute angle to the core layer.

7. The PLC device according to claim 1, wherein the reflective diffraction grating separates the input beam of light into a plurality of constituent wavelengths; wherein the PLC device further comprises a plurality of output ports for outputting the plurality of constituent wavelengths.

8. The PLC device according to claim 1, wherein the reflective diffraction grating comprises a curved, concave or parabolic reflective surface in the second substrate.

9. The PLC device according to claim 1, further comprising first alignment means on the reflective diffraction grating, and second alignment means in the trench engaged with the first alignment means for aligning the reflective diffraction grating with the core layer.

10. The PLC device according to claim 1, wherein the reflective diffraction grating has a plurality of reflective walls defined by a facet length, and a plurality of sidewalls defined by a sidewall length; and wherein an aspect ratio of the diffraction grating, defined by the facet length divided by the sidewall length, is greater than 3.

11. The PLC device according to claim 10, wherein the aspect ratio is greater than 5.

12. The PLC device according to claim 10, wherein the aspect ratio is greater than 10.

13. The PLC device according to claim 1, wherein the reflective diffraction grating has a plurality of reflective walls defined by a facet length, and a plurality of sidewalls defined by a sidewall length; and wherein the sidewall length is less than or equal to two times the average wavelength of the input beam of light.

14. The PLC device according to claim 13, wherein the sidewall length is less than or equal to the average wavelength of the input beam of light.

* * * * *